(12) United States Patent
Gooding et al.

(10) Patent No.: US 9,741,124 B2
(45) Date of Patent: Aug. 22, 2017

(54) METHOD AND SYSTEM OF DEFINING A REGION OF INTEREST ON MEDICAL SCAN IMAGES

(71) Applicant: Mirada Medical Limited, Oxford (GB)

(72) Inventors: Mark Gooding, Oxfordshire (BR); Timor Kadir, Oxfordshire (BR); David Mccabe, Swindon Wiltshire (BR)

(73) Assignee: Miranda Medical Limited, Oxford (GB)

( * ) Notice: Subject to any disclaimer, the term of this patent is extended or adjusted under 35 U.S.C. 154(b) by 281 days.

(21) Appl. No.: 14/348,405

(22) PCT Filed: Sep. 28, 2012

(86) PCT No.: PCT/EP2012/069287
§ 371 (c)(1),
(2) Date: Mar. 28, 2014

(87) PCT Pub. No.: WO2013/045678
PCT Pub. Date: Apr. 4, 2013

(65) Prior Publication Data
US 2014/0247284 A1    Sep. 4, 2014

(30) Foreign Application Priority Data
Sep. 30, 2011   (GB) .................................. 1116989.3

(51) Int. Cl.
*G09G 5/00*      (2006.01)
*G06T 7/00*      (2017.01)
(Continued)

(52) U.S. Cl.
CPC .......... *G06T 7/0081* (2013.01); *G06T 7/0014* (2013.01); *G06T 7/11* (2017.01);
(Continued)

(58) Field of Classification Search
None
See application file for complete search history.

(56) References Cited

U.S. PATENT DOCUMENTS 5,273,040 A  * 12/1993  Apicella .............. A61B 5/0263
                                                       382/130
8,693,755 B2 *  4/2014  Baumgart ................. G06T 5/50
                                                       382/100
(Continued)

FOREIGN PATENT DOCUMENTS

EP           2159756       *   8/2009

OTHER PUBLICATIONS

Gijsbert H. Bol, Simultaneous multi-modality ROI Delineation in Clinical Practice; Elsevier Journal; Computer Methods and Programs in Biomedicine 96 (2009); 22009 Elsevier Ireland Ltd.; pp. 133-140.

*Primary Examiner* — Ryan R Yang
(74) *Attorney, Agent, or Firm* — Optimus Patents US, LLC

(57) ABSTRACT

A method, medical imaging workstation (1000) and hybrid medical imaging scanner (1100) are provided for defining a region of interest (RoI) for display on at least two medical scan images. When displaying a first medical scan image (740), input data defining a RoI on the image is captured, and stored as at least a first region representation (760). The RoI is displayed on a second medical scan image (750), based on the first region representation (760). Changes to the RoI on the second medical scan image (750) are used to update the first region representation (760). There may be separate region representations (760, 770) associated with each of several medical scan images. The invention may improve the definition of a region of interest, by allowing (Continued)

editing on each of multiple image displays (820, 830, 880) to feed through to all medical scan images.

20 Claims, 12 Drawing Sheets

(51) Int. Cl.
*G06T 7/11* (2017.01)
*G06T 7/174* (2017.01)
(52) U.S. Cl.
CPC .... *G06T 7/174* (2017.01); *G06T 2207/10084* (2013.01); *G06T 2207/10108* (2013.01); *G06T 2207/20048* (2013.01); *G06T 2207/20104* (2013.01); *G06T 2207/20132* (2013.01); *G06T 2207/30096* (2013.01)

(56) References Cited

U.S. PATENT DOCUMENTS

| | | | |
|---|---|---|---|
| 2008/0051648 A1* | 2/2008 | Suri | A61B 6/481 600/407 |
| 2011/0016690 A1* | 1/2011 | Narainasamy | A61F 2/30942 29/428 |
| 2011/0125526 A1* | 5/2011 | Gustafson | G06F 19/321 705/3 |
| 2012/0155737 A1* | 6/2012 | Sakaguchi | A61B 5/055 382/132 |
| 2013/0342578 A1* | 12/2013 | Isaacs | G06F 19/321 345/634 |
| 2014/0088433 A1* | 3/2014 | Shan | A61B 5/1128 600/473 |
| 2014/0201670 A1* | 7/2014 | Mallya | G06F 3/0481 715/771 |

\* cited by examiner

METHOD AND SYSTEM OF DEFINING A REGION OF INTEREST ON MEDICAL SCAN IMAGES

CROSS REFERENCE TO RELATED APPLICATIONS

This application is the U.S. national phase of PCT/EP2012/069287 filed Sep. 28, 2012. PCT/EP2012/069287 claims the benefit of E.P. patent application serial no. 1116989.3 filed Sep. 30, 2011, the disclosures of which are both expressly incorporated herein by reference.

TECHNICAL FIELD

The present invention concerns the processing of images obtained during medical scans.

BACKGROUND ART

A variety of technologies can be used to investigate biological processes and anatomy. The following examples are types of scan that may be used to provide medical images: X-Ray; Computed Tomography (CT); Ultrasound (US); Magnetic Resonance Imaging (MRI); Single Photon Emission Tomography (SPECT); and Positron Emission Tomography (PET). Each type of scan is referred to as an 'imaging modality'.

In medical imaging, typically, digital 3-dimensional images are produced. Medical imaging workstations are commonly used to allow the viewing and manipulation of these images. Medical images are read, analysed and reviewed by specialists, for example radiologists.

Typically, a scan provides a 'dataset'. The dataset comprises digital information about the value of a variable at each of many points. The points are different spatial locations that are spread throughout 3 physical dimensions, i.e. each point is at a particular location on a three dimensional grid. The variable may typically be an intensity measurement. The intensity may be, for example, an indication of the X-Ray attenuation of the tissue at each particular point.

In such a three dimensional dataset, the element of the scan image located at a particular spatial location may be referred to as a 'voxel'. A voxel is therefore analogous to a 'pixel' of a conventional 2-Dimensional image.

Although the dataset of the medical scan is 3-Dimensional, it is typically displayed to a user as a two dimensional image on a medical imaging workstation. An image slice from a 3-d dataset is simply a 2-d representation, consisting of those data points that lie on a particular 2-d plane through the 3-d image. A typical 3-d dataset, such as one from an MRI scan, will have a matrix of regularly spaced data points. As a non-limiting example, the MRI-scan may have data points whose centres are spaced by 1 millimeter in the x- and y-directions across any plane of the scan. Consecutive planes may, for example, be parallel and separated by 7 millimeters.

The 3-D scan may therefore be divided up into tens or hundreds of parallel, 2-D images for display purposes. The user of a workstation can then flick through the images in sequence, for example, thereby allowing a view of successive cross sections of the tissue that was scanned.

Typical workstations allow the 2-D slices to be viewed individually, or sequentially in successive steps. The view may be along a selected one of three perpendicular directions. For a human subject lying down, the axes of the three perpendicular directions may, for example, be along the 'long axis' of the body, through the body from top to bottom, and 'across' the body from one side to the other. These axes are conventionally referred to as:

(i) 'axial', for a cross-section that lies along an axis corresponding to the long axis of the body;
(ii) 'coronal', for a cross-section that lies along an axis running from the front to back; and
(iii) 'sagittal', for a cross-section that lies along an axis that runs from side to side.

Thus the axial plane is normal to the axis that runs along the head to foot direction, the coronal plane is normal to the front to back axis and sagittal plane is normal to the axis that runs left to right Henceforth, the term 'scan image' should be construed as meaning a three dimensional dataset that results from performing a medical scan. However, when the scan image is displayed, only a two dimensional slice of the dataset may be on view at any one time as an image.

Medical scan images usually have as their subject humans. However, scan images may also be obtained of non-human animals, particularly as part of medical research projects.

Medical scan images may include information about a wide variety of anatomical features and structures. For example, a scan image may show various types of healthy tissue, such as bone and organs within the body. A scan image may also show abnormal tissues. The term 'lesion' is often used to describe various types of abnormal tissue. One common example of a lesion is a tumour. However, a scan image may also show other types of lesions, such as cysts or swollen glands. The word 'lesion' should henceforth be construed to include both tumours and other types of abnormal tissues.

The purpose of obtaining a medical scan image is often to detect abnormal tissue. So, a typical example of an application of medical imaging is in the identification and 'staging' of cancerous tumours.

'Multiple modalities' may be used to provide medical scan images. This approach involves obtaining scan images of the same region of tissue by more than one modality. For example, the same region of tissue may be imaged using both a PET scan and a CT scan. Another important example of a multiple mode scan is a SPECT/CT scan. Both PET/CT and SPECT/CT scans combine the predominantly anatomical and structural information obtained from a CT scan with a scan which measures the biological function.

Scanners that can carry out multiple mode scans are referred to as 'hybrid scanners'. Typically, a hybrid scanner allows the subject to be scanned by both modalities in the same sitting.

A key task in the interpretation of medical image scans is the need for a user to be able to define a region on a scan image. That region is henceforth referred to as a 'region of interest'. A typical region of interest is a portion of a scan that shows a particular anatomical feature or structure. However, this leads to the task of defining how one region of interest in a first scan image relates to corresponding portions of other scan images with the same content, e.g. images of the same patient. This task arises in particular in connection with radiotherapy. The process of defining a region is often referred to as 'contouring'.

Working with Multiple Scan Images in Radiotherapy

In radiotherapy, the aim is to deliver a high radiation dose to cancerous tissues. Simultaneously, the radiation given to nearby normal tissues must be minimised. One approach to achieving this is 'image based planning' In simple terms, this means planning radiation dosage, partly on the basis of information visible in medical scan images. An image of a patient, i.e. a dataset, may be available that is from a 2D, 3D or even a 4D medical scan.

The first step of image based planning is to define contours or regions of interest on a single planning image. The planning image is normally a CT image. The contours or regions of interest delineate:
(i) the location of target regions, e.g. the tumour, for treatment; and
(ii) normal structures for avoidance.
One planning image may in fact have several regions of interest, each defined by a separate set of contours.

A process known as simulation is then used to estimate the radiation that should be delivered to the structures, for a given treatment plan.

Contours or regions of interest may also be defined in medical images for reasons other than radiation treatment planning. One example is for accurate lesion measurement during diagnosis.

Multiple clinical images for a patient may be acquired for using a variety of modalities, such as CT, PET and MR. Each of these images provides anatomical and functional information, at different resolutions. Each type of image brings some advantages, for example MR images show good soft-tissue discrimination, which may enable the identification of the boundaries of a tumour. A CT image is typically used for radiotherapy contouring, because the attenuation of x-rays can be better estimated using CT within the treatment simulation and planning.

Therefore it may be beneficial to use multiple images and image modalities within the contouring process, to enable more precise contouring. See reference [1] at the end of this background section.

The usual prior art approach to using multiple images and image modalities within the contouring process involves aligning the multiple images to each other. In this approach, the images are first aligned to a common frame of reference. This alignment is done in such a way that contours defined on one image may be transferred directly to another. How this is done depends on the particular group of images that are available.

In the simplest case, images may have been acquired in the same imaging study, on the same scanner. That is, the multiple images were acquired either sequentially or concurrently, while the patient remains stationary in the scanner. Such images are referred to as being in the same 'frame of reference'. An example is when multiple sequences of MRs are acquired sequentially, of one patient at 'one sitting'.

In some situations, it is not possible to acquire all the images in the same frame of reference, i.e. in the same scanner. For example, different scanner types might be necessary.

FIG. 1 shows an example of two images. In this example, the images have been obtained of the same patient, but at different times. In addition, different scanners have been used. The medical scan images of FIG. 1 may be displayed by a medical imaging workstation.

Reference 110 shows the screen of the medical imaging workstation. The result of a first scan is shown as first scan image 120. Adjacent to first scan image 120 is the result of a second scan, which is second scan image 130. A portion of tissue generally labelled 140 is shown on first scan image 140. At a slightly different scale, the same portion of tissue is shown and labelled 150 on second scan image 130. The Region of Interest 'ROI' differs in shape and size between the two images. This difference may arise due to one or more of: the different scale of the two scans; movement of the patient between the two scans; and the different display orientations of the two displayed images.

The usual prior art approach to images that are not in the same frame of reference is to aligned the images using a more complex transformation than was needed for images that are in the same frame of reference. This process of aligning images is known as 'image registration'.

The primary aim of image registration in contour planning is simply to correct for differences in patient position.

There are three well known image registration methods. These are termed 'rigid', 'affine' and 'deformable' registration. FIGS. 2-4 illustrate each of these registration methods. FIGS. 2-4 are shown on a single page, in order to facilitate comparison between the three approaches.

FIG. 2 shows a rigid alignment method of image registration. In the example of FIG. 2, in three dimensions (3-D), 6 parameters require calculation: Translations (3 parameters); Rotation (3 parameters).

FIG. 3 shows an affine alignment method of image registration. In the example of FIG. 3, in 3-D, 12 parameters are required: Translations (3 parameters); Rotation, Shearing and Scale (9 parameters).

FIG. 4 shows a deformable alignment method of image registration. In the example of FIG. 4, in 3-D, 3 parameters are required per image element: Translations (3 parameters) at each image location. This can be thousands of parameters for a 3D image.

References [2] and [3] explain other methods of aligning pairs of images.

There are a number of techniques in the prior art which allow a user to delineate regions using multiple imaging volumes. One approach presents a first image as a base layer, over which one or more semi-transparent overlays are displayed. Each semi-transparent image is derived from a different image than the first image. This approach is known as a 'fused view' in medical imaging, see ref [1]. Here, objects are drawn by the user, and these objects are created in the geometric space of the first image. These objects will thus be shown in the base layer. This enables the user to define the contour on the first image, whilst being able to view and use information from the overlying images.

However, the various images may be acquired at different orientations and resolutions. So either a rigid or non-rigid transformation is usually required to produce each overlay image. As a consequence, the image data shown to the user in the overlay images(s) is not the originally captured image data for that image. The data has been warped or rotated, or in some other way resampled, in order to create the overlay image.

This may be problematic for several reasons:
(i) The resolution of the image shown in the overlay may not produce resampled images of sufficient quality. For example, MR images are typically highly anisotropic, which means that the voxels may not be cuboid. The voxels may typically be 3 mm×0.3 mm×8 mm. Such images are best viewed in their original orientation, and do not produce clear images if rotated or warped. The application of translations and isotropic scalings are acceptable, however. These are needed for zooming and panning operations that are useful in medical imaging visualisation software.
(ii) Aside from visual quality, transformation of the overlay image also means that its voxels are modified. This modification means that the voxels are no longer the original ones acquired from the scanner. In some circumstances, it is beneficial to be able to use the originally acquired voxels. One example is in PET, where the values of the voxels convey information that it is important to preserve.

Another method in the prior art involves warping a region of interest to multiple different images. Such an approach may begin with one or more regions that were defined on a previous planning image. These regions are then transformed to a new planning image, for example in order to start planning a new phase of radiotherapy. This process is known as 're-planning'. See reference [4]. Re-planning is applied where, for example, a patient is being retreated for recurring disease. The user then warps the previously defined regions of interest from the previous planning volume to the new one.

In this approach, each region of interest is resampled into the space (frame of reference) of the new planning volume, using a transformation that maps one volume onto the other. As discussed earlier, a registration algorithm may be used to estimate such a transformation between the previous and the new planning images. However, in this case, a new region of interest is simply created on the new planning volume. The object of this approach is simply to create the new region on the new planning image, whilst attempting to avoid losing any information that could still be useful from the region of interest that was originally created on the original planning image. Critically, such re-planning systems are not designed to help the user define one region using multiple images and have limited functionality, for example:
(i) Any such regions are treated as two separate and unrelated 'objects' by the system. A user would be required to warp the region of interest from the new planning image back to the original planning volume, if they wanted to make further edits using information on that image. After any edits, the region would again have to be warped back to the new volume to continue with the replanning operation.
(ii) Prior art re-planning systems are designed to allow the user to edit regions in just two images at a time, which are usually spaced over a period of days, weeks or months.

The concept of using multiples images for automated segmentation has been considered in academic research. See the approach in reference [5]. However, such approaches have the drawback that the user has no control, and cannot adapt the process.

FIG. 5 shows an illustration of the extent of a region of interest in a scan image. This may be accomplished in one of several ways. Two of these are as follows:
(i) Using a 'boundary box'. The boundary box is a 3-Dimensional shape, for example a cuboid or an ellipsoid. A user may define the boundary box, based on what can be seen on the first scan. A cursor on a screen of a medical imaging workstation may be used to define the boundary box, under the control of a mouse or tracking ball. The boundary box is typically placed so as to encompass all of an object that is to be analysed. A threshold can then be set. The 'first region of interest' then comprises all the spatial locations within the boundary box at which the measured value exceeds the threshold.
(ii) A variant of approach (i) is to define a boundary box, and then find the maximum value of any spatial location within the boundary box. A percentage of the maximum value, for example 40% of the maximum intensity, is then selected as a threshold. The 'first region of interest' then comprises all the spatial locations within the boundary box at which the measured value exceeds the threshold.

FIG. 5 shows an example of a boundary box 210 that may be used in approaches (i) or (ii) above. Within boundary box 510 is an area of tissue that the operator of a medical imaging workstation suspects may be a lesion. In accordance with the approach outlined under (i) above, a medical imaging workstation or the hybrid scanner identifies all the spatial locations within boundary box 510 where a threshold value, for example of intensity, is exceeded. These locations form the first Region of Interest ROI.

REFERENCES

[1] 'CT-MRI image fusion for delineation of volumes in three-dimensional conformal radiation therapy in the treatment of localized prostate cancer'. G. L. Sannazzari, R. Ragona, M. G. Redda, F. R. Giglioli, G. Isolato and A. Guarneri. British Journal Of Radiology 2002; 75:603-607
[2] 'Medical image registration'. D Hill, P Batchelor, M Holden and D Hawkes. Phys Med Biol 2001; 46:R1-R45
[3] 'A viscous fluid model for multimodal non-rigid image registration using mutual information'. E D'Agostino, F. Maes, D. Vandermaeulen and P. Suetens. Medical Image Analysis 2003; 7(4):565-575
[4] 'Comparison of Contour-to-CT registration techniques during adaptive re-planning of radiation therapy for patients with bulky disease'. J Choe, J W Piper, A S Nelson, A D Nelson, N Kuc, R Kulasekere, J. Greskovich. IJROBP. 2007; 69(3 Suppl S):S725
[5] 'Concurrent multimodality image segmentation by active contours for radiotherapy treatment planning'. I. El Naga, D. Yang, A. Apte, D. Khullar, S. Mutic, J. Zheng, J. D. Bradley, P. Grigsby, and J. O. Deasy. Med. Phys. 2007; 34: 4738
[6] 'Level Set Methods and Fast Marching Methods'. J. A Sethian. Cambridge University Press. 1999.

DISCLOSURE OF INVENTION

In accordance with a first aspect, the invention provides a method of defining a region of interest, or 'contouring', for display on at least two medical scan images, in accordance with claim 1. In accordance with a second aspect, the invention provides a medical imaging workstation defining a region of interest, or 'contouring', for display on at least two medical scan images in accordance with claim 17. In accordance with a third aspect, the invention provides a hybrid scanner in accordance with claim 20. In accordance with a fourth aspect, the present invention provides a computer program product in accordance with claim 21.

In contrast to the prior art, the present invention may allow:
(i) The use of multiple medical scan images, each displayed in their original orientation or on the basis of the originally acquired data, without requiring registration of multiple images to one reference image;
(ii) Concurrent update & visualisation on multiple images, based on edits to a region as viewed on any of the multiple medical scan images.

The invention may therefore provide an accurate method for defining a region of interest, or 'contouring', for display on at least two medical scan images, for example for use in radiotherapy planning.

The invention may offer great flexibility when defining one or more regions of interest on multiple medical scan images. For example, part of a region of interest may be defined on a first medical scan image. This may be done, whilst watching the development of the region of interest develop on one or more of the other images. Then, a user may switch his attention to one of the medical scan images, other than the first, and complete the region of interest by providing inputs to that medical scan image. The second medical scan image may offer a clearer view, for example of soft tissue, than was available on the first medical scan image. Thus different portions of a region of interest can be defined, i.e. contouring may be carried out, using the 'best' parts of each of several medical scan images. Those entire images do not need to be registered to one chosen image, and may therefore all display their dataset as originally captured, and may remain in their original orientation.

The invention allows a user to delineate a region or regions, by making changes on two or more displayed medical scan images. The region of interest that is thereby created will be displayed on each of the images, which can be viewed in their original orientation and geometry. The invention can be implemented and still give access to the original voxel values of each displayed medical scan image.

Notably, the invention offers possibilities that were not recognised in the prior art, such as [5]. In particular:
(i) The present invention provides the user with the capability of visualising multiple image datasets, each in its original geometry, and defining regions and/or making edits to one or more regions, that were defined in another dataset.
(ii) The present invention provides the user with the capability of concurrent delineation of one or more regions of interest in multiple images, all displayed in their original geometry.

With the invention, the transformation between the space in which a region is defined and the space of the medical scan image being viewed may be identical, or trivially related. The relation may be a simple scaling or translation. So the display can be made and altered in a computationally efficient manner.

Each displayed image may have a region representation associated with it. Any user inputs to alter the region of interest on one image result in changes to that image's stored region representation, and those changes are then transformed to the other region representations. For example, where the user edits the delineation of a region of interest on a first image, the edit is made to the stored region representation for the first image. The region representation may be an 'internal' representation, which is a set of information about the spatial extent of the region representation. The updated delineation is subsequently mapped onto the other internal representations, by translating the stored region representation to update the other region representations for the other images. Thus all the internal representations are synchronised. The visualisation for all images is updated to reflect the new region delineation.

Notably, the invention differs significantly from the 're-planning' approach outlined in the Background section. With the 're-planning' system, the original region of interest from a historical planning image was translated onto a new planning image. Information on that original planning image could then be re-used, and used as the basis for planning a next phase of treatment. There was no link to the previous region of interest on the historical planning image. So as the region of interest is refined on the new planning image, those changes did not permeate back to the original planning image.

DETAILED DESCRIPTION

The present invention provides a system and method for defining a region of interest for display on at least two medical scan images, each medical scan image comprising corresponding content. The content may be a region of tissue, such as an anatomical structure.

Figure 1:
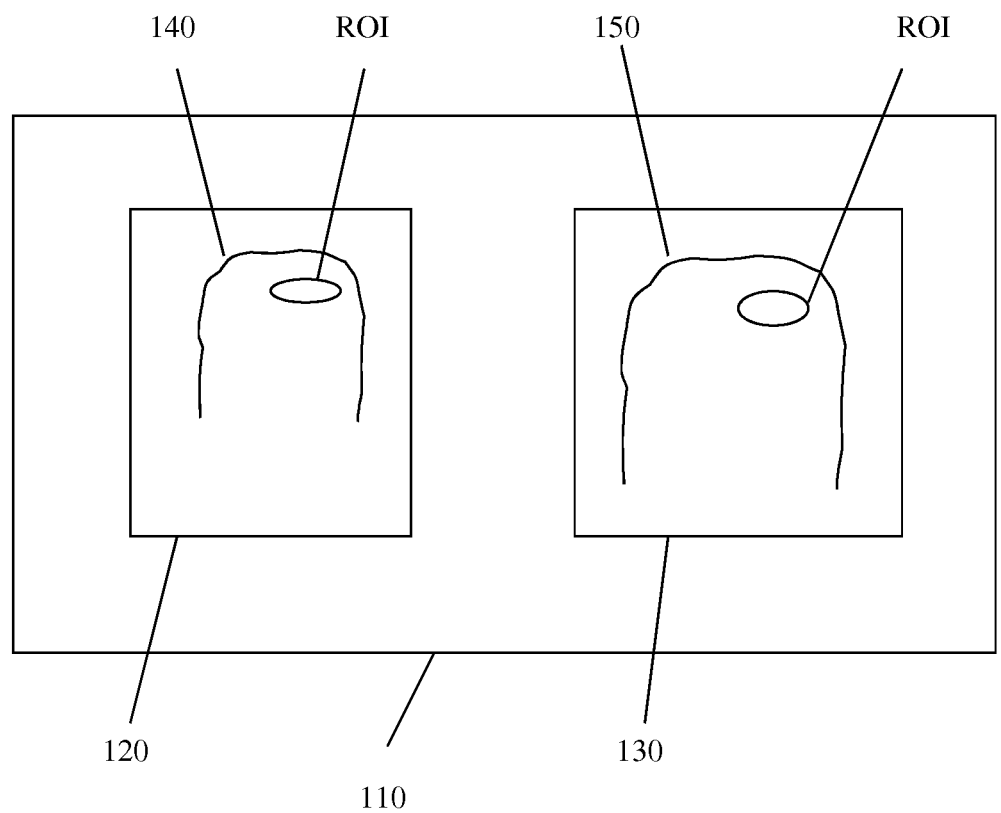
FIG. 1 shows a workstation screen with two medical scan images, in accordance with the prior art.
Figure 2:
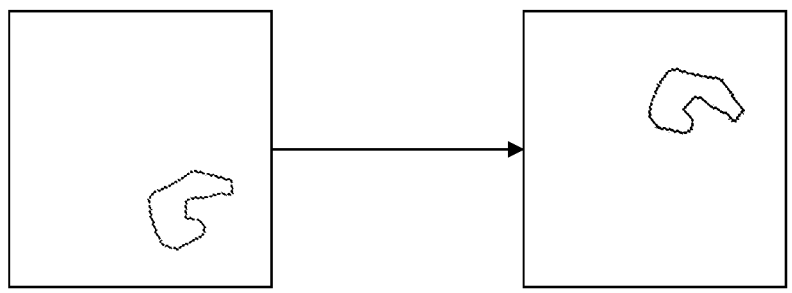
FIGS. 2-4 each show a prior art form of image registration.
Figure 3:
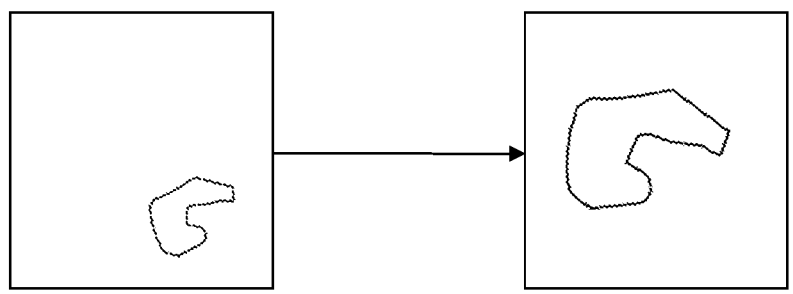
Figure 4:
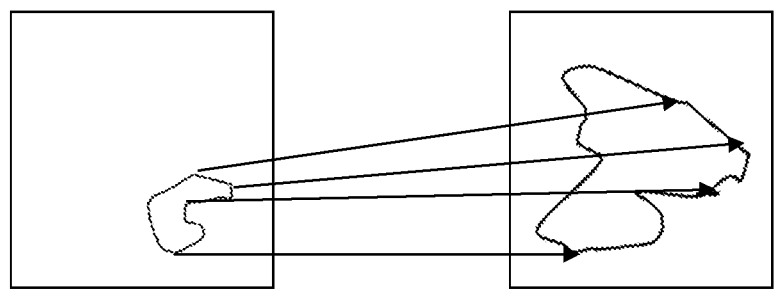
Figure 5:
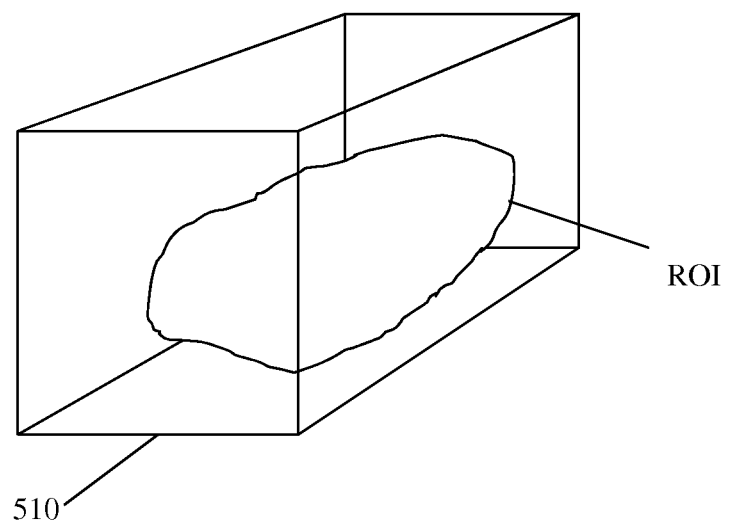
FIG. 5 shows an illustration of the extent of a region of interest in a medical scan image.
Figure 6:
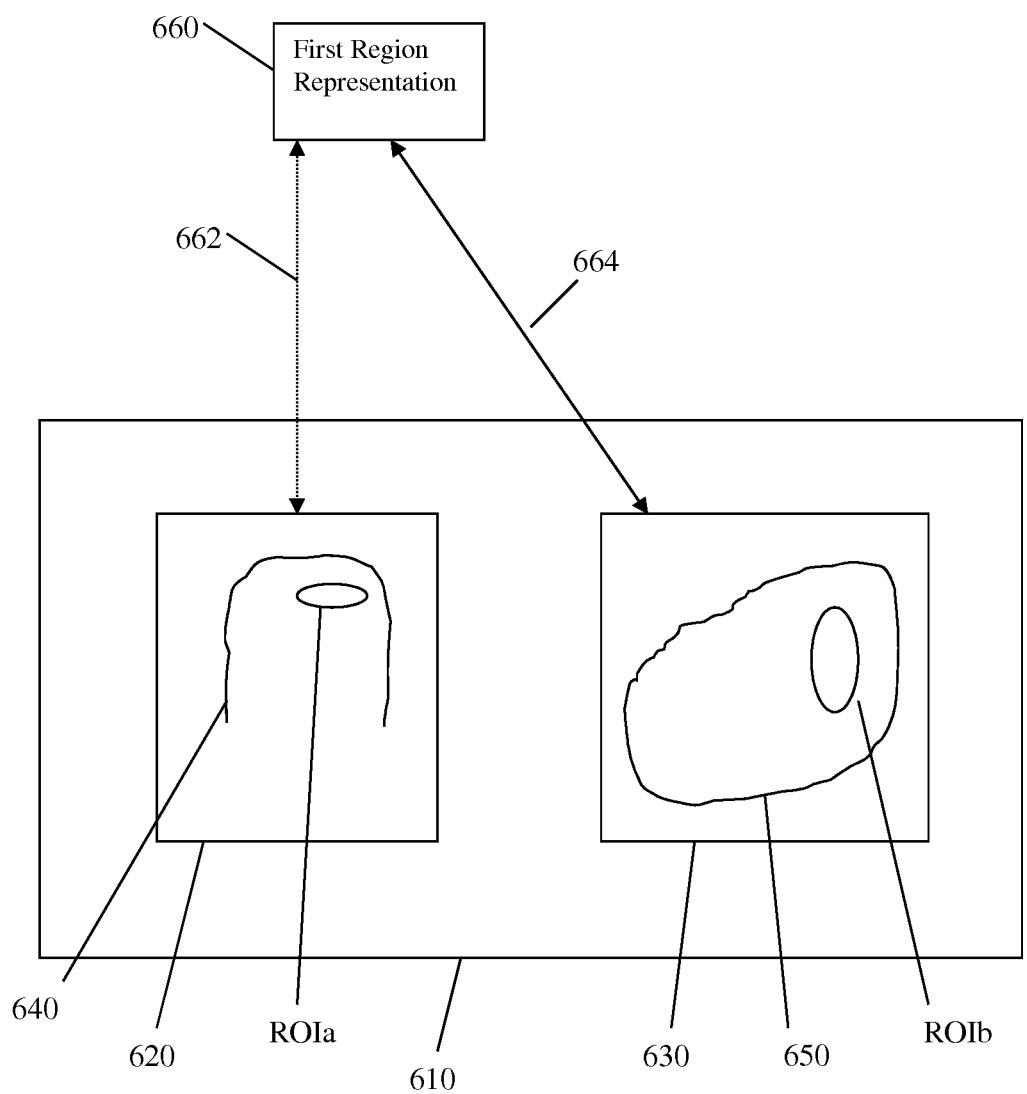
FIG. 6 shows an embodiment of the invention, with a single region representation and two displayed medical scan images.

A first embodiment of the system and method of the invention is explained with reference to FIG. 6. FIG. 6 shows the display of a first medical scan image 640 on a first display screen area 620.

A user defines a region of interest ROIa on the first medical scan image 640. The user's actions are captured as first input data. The first input data is stored as first region representation 660.

Link 662 between first medical scan image 640 and first region representation 660 indicates transfer of the first input data.

The region of interest ROIb is displayed on a second medical scan image 650, on a second display screen area 630. The same region of interest is displayed on both the first medical scan image 640 and the second medical scan image 650, with the suffixes a and b only being used to aid explanation of the drawings.

The display of the region of interest ROIb on the second medical scan image 650 is based on the first region representation 660. Link 664 between first region representation 660 and the second medical scan image 650 indicates transfer of data concerning the first region representation, to enable display of the region of interest on second medical scan image 650.

A user may now make changes to the region of interest ROIb displayed on the second medical scan image 650. This results in the capture of second input data from the user. The second input data comprises the changes to the region of interest ROIb displayed on the second medical scan image 650.

The first region representation 660 is then updated, in accordance with the changes, on the basis of the second input data.

The updated first region representation is then available for viewing on first medical scan image 640. However, the user may not be viewing the two medical scan images simultaneously.

The first region representation 660 may store information about the geometrical space occupied by the region of interest. Such information may, for example, comprise a mesh of points. These points can be the locations of voxels that make up the region of interest ROIa on the first medical scan image 640. However, the stored information may take other forms, and could comprise all the points of the dataset of the first medical scan image 640 that lie within region of interest ROIa as currently defined.

The system and method of FIG. 6 may furthermore allow the capture of further changes to the region of interest that a user makes on either the first and/or second medical scan images. The first region representation 660 is then updated in accordance with those further changes. The region of interest displayed on both the first and second medical images can then be updated, based on the updated region representation.

This provides the user with the possibility to switch his attention between the first and second medical scan images, at will. In particular:
(i) One part of the region of interest may appear in greater detail, or simply more clearly, on one image than the other. In that case, the user can make changes to the region of interest on the image where that portion is easiest to see.
(ii) The user can switch his gaze between the two images, and watch as he makes changes to the region of interest on each image. It may be particularly advantageous for the regions of interest ROIa and ROIb to be updated in near real-time, to assist this.

In the system and method of FIG. 6, the region representation 660 is stored in the frame of reference of the first medical scan image 640. Link 662 is shown as a dotted line, as it is a minor computational issue to pass updates made to ROIa on first medical scan image 640 back to the first region representation 660. Likewise, any updates to first region representation 660 that result from changes that the user makes to ROIb can be passed from first region representation 660 to the first medical scan image 640.

The 'space', or frame of reference, in which first region representation 660 is defined and the space of the medical scan image 640 may be:
(i) Identical. In this case, no transformation is necessary where link 662 is shown.
(ii) Trivially related. The relation may be a simple scaling or translation. So link 662 would be just a simple scaling or translation, and this allows display of the region of interest ROIa, and capturing any alterations to ROIa, in a computationally efficient manner.

However, second medical scan image 650 is displayed in a different frame of reference than first medical scan image 640. Second medical scan image 650 comprises the original data of that image, and may be displayed in its original acquisition orientation. Second medical scan image 650 has not been subject to image registration to the frame of reference of first medical scan image 640, as is usual in the prior approaches. So, prior to displaying the region of interest ROIb on the second medical scan image 650, the region representation 660 is transformed into the frame of reference of the second medical scan image 650, for display. Link 664, highlighted in thick font, indicates this transformation.

The transformation is achieved by applying to region representation 660 a transformation that is suitable for mapping first medical scan image 640 to second medical scan image 650. In this manner, the original version of the second medical scan image 650 may be viewed, with the region of interest ROIb that is displayed on it corresponding to the region representation 660. The second medical scan image 650 has not been warped as part of image registration. This may overcome some or all of the prior art drawbacks of:

(i) poor image quality;
(ii) voxels being modified;
(iii) objects such as bones on warped images not appearing in their natural shape.

Two way link 664 indicates that:
(i) Changes to first region representation 660 that arise as a result of a user altering ROIa need to be transformed to the frame of reference of second medical scan image 650, for display; and
(ii) When a user alters ROIb on second medical scan image 650, those changes must be transformed back to the frame of reference of first medical scan image 640, which is the frame of reference used for first region representation 660, in order to be used to update the first region representation 660.

In a second embodiment of the invention, which is an alternative to that shown in FIG. 6, the first region representation 660 is stored in a frame of reference that differs from the frames of reference of both the first and second medical scan images. In this embodiment, the step of storing the first input data comprises transforming the first input data from the frame of reference of the first medical scan image 640 into the frame of reference of the first region representation 660.

Then, prior to displaying the region of interest ROIb on the second medical scan image 650, the first region representation 660 is transformed from the frame of reference of the first region representation 660 into the frame of reference of the second medical scan image 650.

A figure illustrating this second embodiment would correspond to FIG. 6, except that link 662 would appear as link 664, since it would indicate a frame of reference transformation.

Figure 7:
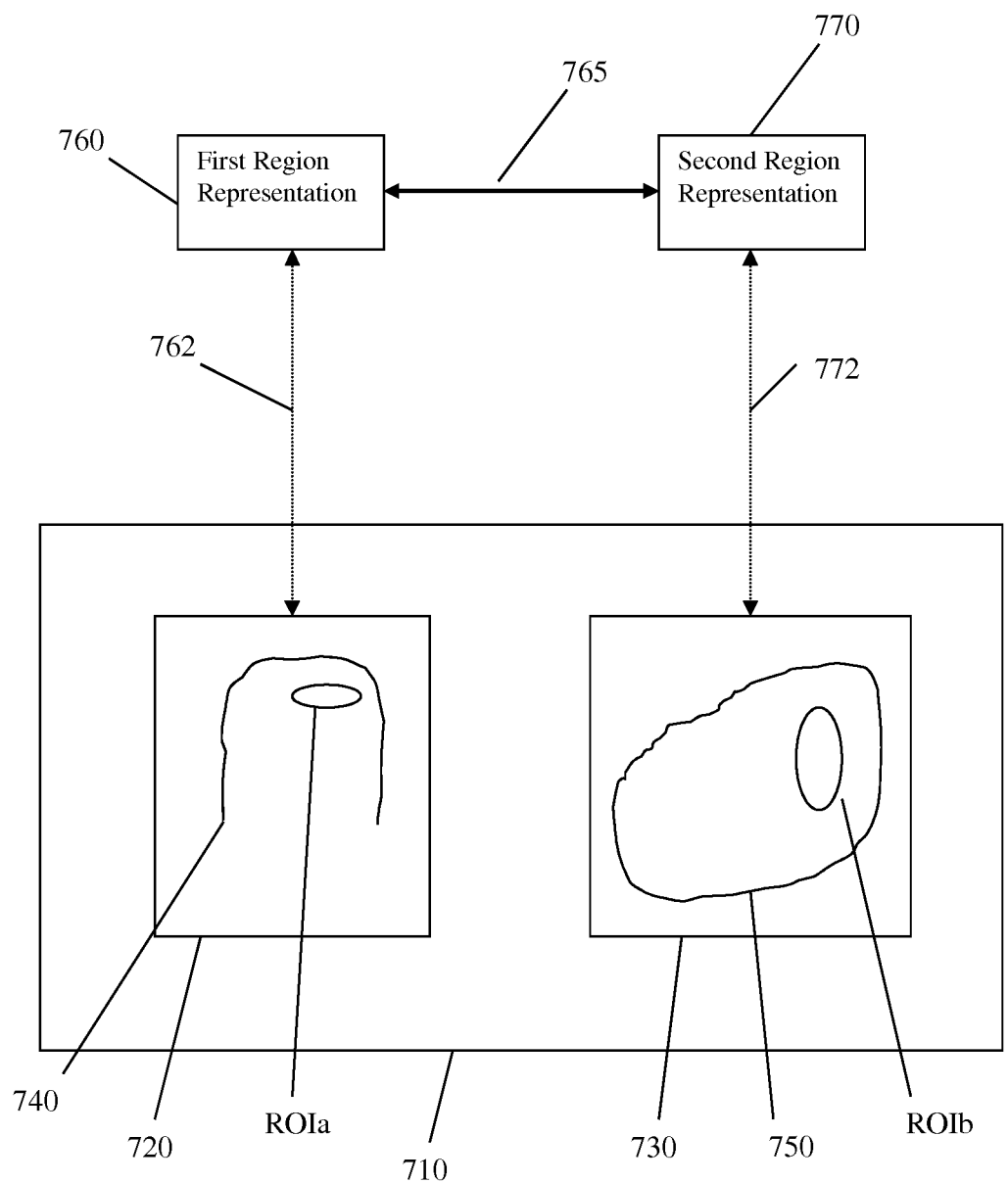
FIG. 7 shows an embodiment of the invention, with two region representations and two displayed medical scan images.

FIG. 7 shows a third embodiment of the invention. Similar reference numerals in FIGS. 6 and 7 show corresponding elements.

The system and method of FIG. 7 involve creating a second region representation 770. Second region representation 770 is associated with the second medical scan image 750. The step of displaying the region of interest ROIb on the second medical scan image 750 comprises displaying the second region representation 770.

Initially, the second region representation 770 can be based on the first region representation 760. The second region representation 770 is in a different frame of reference than the first region representation 760. So a transformation between those two frames of reference is needed, as indicated by link 765 in FIG. 7.

If the first region representation 760 is chosen to be in the same frame of reference as first medical scan image 740, then no transformation is required between the frames of reference of the first medical scan image 740 and the first region representation 760. Link 762 is shown dotted, to indicate that updates may flow without the need for transformation. However, a simple scaling or translation may be used.

Similarly, if the second region representation 770 is chosen to be in the same frame of reference as second medical scan image 750, then no transformation is required between their frames of reference. Link 772 is shown dotted, to indicate that updates may flow without the need for transformation.

If the first region representation 760 is chosen to be in the same frame of reference as first medical scan image 740, and the second region representation 770 is chosen to be in the same frame of reference as second medical scan image 750, then a transformation is required for:

(i) Changes to the ROIa to pass from first region representation 760 to second region representation 770; and
(ii) Changes to the ROIb to pass from second region representation 770 to first region representation 760. The necessary transformation is shown by link 765.

If a user makes changes to the region of interest ROIb displayed on the second medical scan image 750, the step of updating the first region representation 760 comprises two substeps. Firstly, second region representation 770 is updated in accordance with the changes to ROIb that have been captured. Then the first region representation 760 is updated, on the basis of the second region representation 770, using the appropriate transformation indicated by link 765.

The transformation indicated by link 765 is one that is suitable for mapping the first medical scan image 740 to the second medical scan image 750, for the example given above where the first region representation 760 is in the frame of reference of first medical scan image 740, and the second region representation 770 is in the frame of reference of second medical scan image 750. However, it is within the contemplation of the invention that one or both of the following options could be chosen instead:
(i) First region representation 760 could be in a frame of reference different to that of first medical scan image 740. In this case, link 762 would need to be replaced by a transformation that mapped information between the chosen frame of reference of first region representation 760 and the frame of reference of first medical scan image 740.
(ii) Second region representation 770 could be in a frame of reference different to that of second medical scan image 750. In this case, link 772 would need to be replaced by a transformation that mapped information between the chosen frame of reference of second region representation 770 and the frame of reference of second medical scan image 750.

If either or both of the above options (i) or (ii) were chosen, then the transformation 765 shown in FIG. 7 would need to be a transformation suitable for mapping the frame of reference of first region representation 760 to the frame of reference of second region representation 770, and vice versa.

Comparison of the embodiments of FIGS. 6 and 7 shows some of the differences between them. The use of a single region representation 660 means that any user action on one medical scan image to update an existing region of interest, or define one or more new regions of interest, occurs on the other image display implicitly, without needing updating of a second region representation. However, with the first and second region representations 760 and 770, i.e. multiple internal representations, there is a transformation step required to update one of the region representations 760, 770 when a user enters data that changes the other region representation 760, 770.

The updates in the embodiments of either of FIG. 6 or 7 can occur automatically, so that the user can see the effect of a delineation change on both displayed images, concurrently. Alternatively, the update can be made an explicit step controlled by the user. This may give the user more control of the process, or allow the user to compare edited delineations of the same region.

Alternatively, the automatic update of the region of interest could only occur on visible images. So a region representation would only need to be updated when the image to which it is linked is already visible, or at the time point when it is made visible. This may increase speed.

In all cases, the user can be presented with an impression of editing a single region entity across multiple images, even though it may be represented by either one or more region representations.

Figure 8:
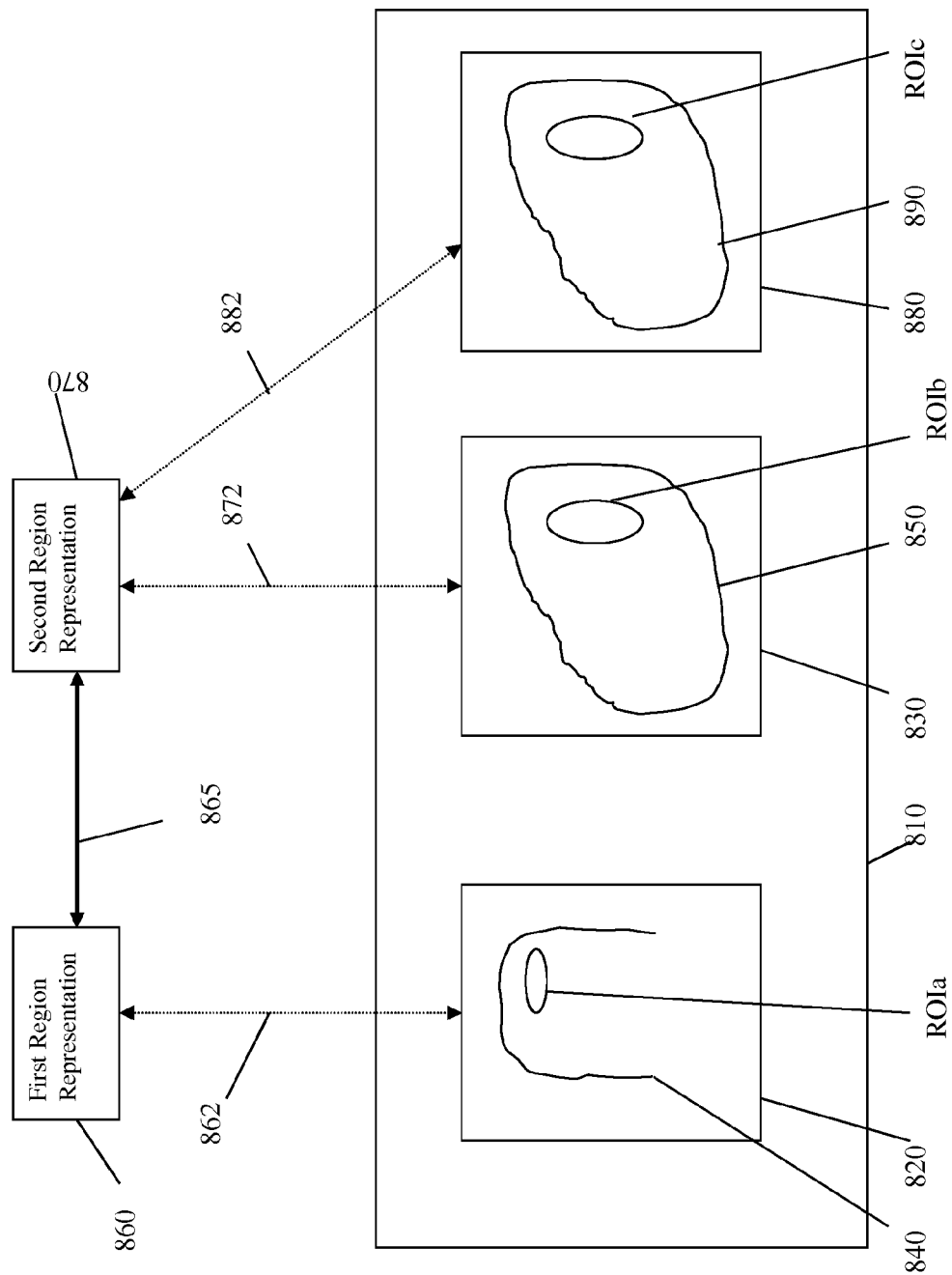
FIG. 8 shows an embodiment of the invention, with two region representations and three displayed medical scan images.

FIG. 8 shows a fourth embodiment of the invention. Similar reference numerals in FIGS. 7 and 8 show corresponding elements.

The embodiment of FIG. 8 has a third display area 880. Third medical scan image 890 is displayed on third display area 880, and has region of interest ROIc.

Second region representation 870 stores information about the geometrical space occupied by the region of interest. The region of interest ROIc on third medical scan image 890 is displayed on the basis of the second region representation 870, without the need for transformation. This may be advantageous when third medical scan image 890 shares has the same geometrical properties as second medical scan image 850. This means that they are identical in size, orientation or resolution.

The use of second region representation 870 to provide region of interest ROIb and ROIc allows the use of fewer region representations than otherwise might be appropriate. This approach reduces the storage requirements.

With the system and method depicted in FIG. 8, the following sequence of events may occur:
(i) A user creates a region of interest ROIa on first medical scan image 840.
(ii) The input data from the user, defining region of interest ROIa, is captured and stored as first region representation 860;
(iii) First region representation 860 is transformed to second region representation 870, and regions of interest ROIb and ROIc are displayed, based on second region representation 870;
(iv) A user makes changes to region of interest ROIc, which results in the capture of second input data from the user;
(v) The second input data is used to update the second region representation 870 in accordance with the changes;
(vi) Second region representation 870 is transformed to first region representation 860;
(vii) Updated region of interest ROIa is displayed, based on updated region representation 860.

The embodiment of FIG. 8 could, alternatively, be configured to displaying the region of interest ROIc on the third medical scan image 890, by transforming the first region representation 860 directly to the frame of reference of the third medical scan image, from the frame of reference of first region representation 860.

Figure 9:
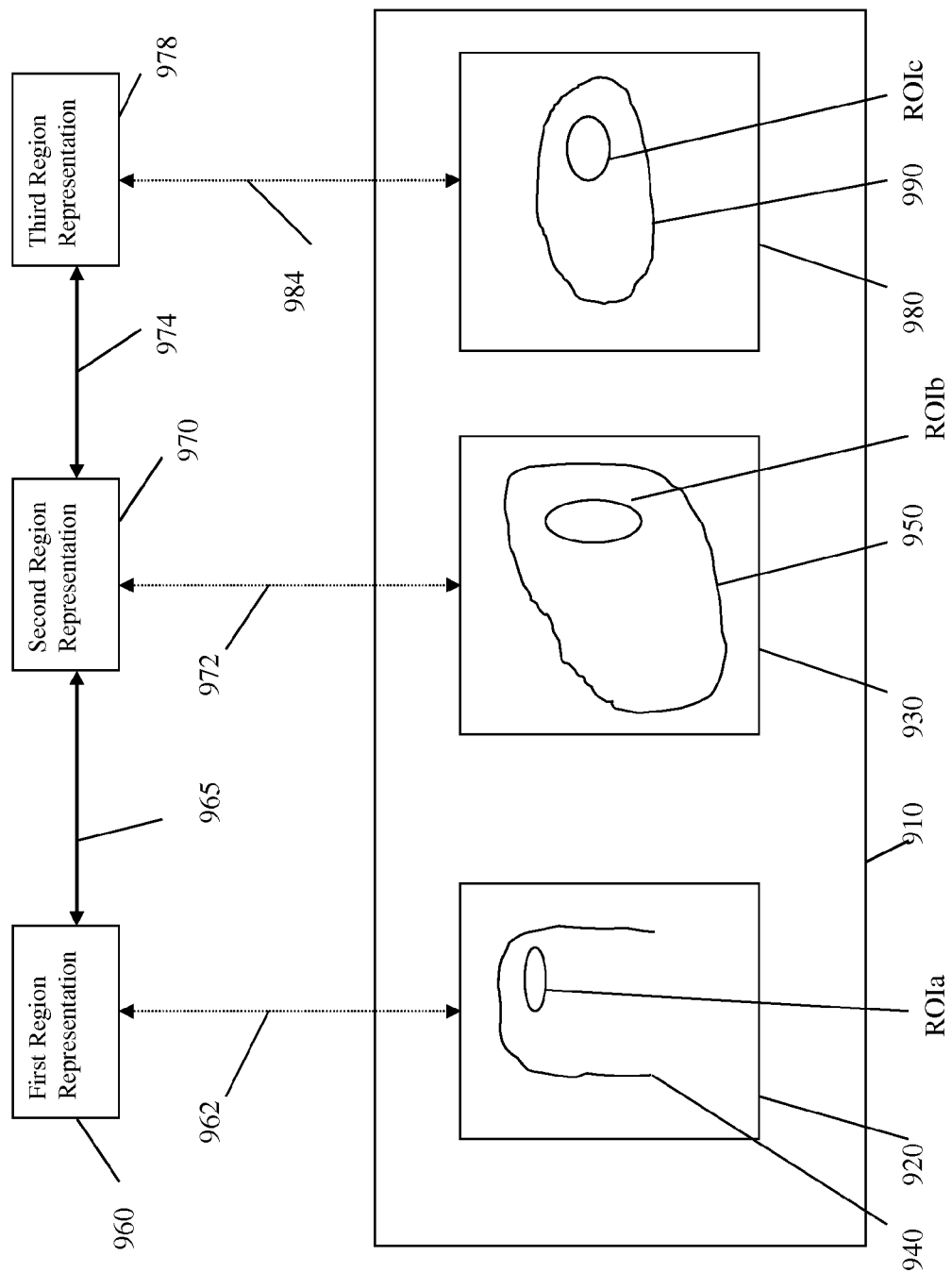
FIG. 9 shows an embodiment of the invention, with three region representations and three displayed medical scan images.

FIG. 9 shows a fourth embodiment of the invention. Similar reference numerals in FIGS. 8 and 9 show corresponding elements.

The embodiment of FIG. 9 has a third display area 980. Third medical scan image 990 is displayed third display area 980, and has region of interest ROIc.

Third region representation 978 stores information about the geometrical space occupied by the region of interest ROIc. The region of interest ROIc on third medical scan image 990 is displayed on the basis of the third region representation 978.

Third region representation 978 is stored in the frame of reference of third medical scan image 990, which differs from the frames of reference of first medical scan image 940 and second medical scan image 950. Link 974 shows that a transformation is necessary between the frame of reference of second region representation 970 and the frame of reference of third region representation 978. However, link 978 shows that no transformation is necessary between the third region representation 978 and third medical scan image 990.

Although not shown on FIG. 9, there may be a direct transformation between first region representation 960 and third region representation 978.

With the system and method depicted in FIG. 9, the following sequence of events may occur:
(i) A user creates a region of interest ROIa on first medical scan image 940.
(ii) The input data from the user, defining region of interest ROIa, is captured and stored as first region representation 960;
(iii) First region representation 960 is transformed to second region representation 970, and region of interest ROIb may be displayed;
(iv) First region representation 960 is transformed to third region representation 978, and region of interest ROIc is displayed
(v) A user makes changes to region of interest ROIc, which results in the capture of second input data from the user;
(vi) The second input data is used to update the third region representation 978 in accordance with the changes;
(vii) Third region representation 978 is transformed to both First region representation 960 and second region representation 970;
(viii) Updated regions of interest ROIa and ROIb may be displayed.

In the embodiment of FIG. 9, in effect:
(i) the first 960 and second 970 region representations are updated by transforming the third region representation 978 to the frame of reference of the first and second medical scan images, when changes are made to the region of interest ROIc displayed on the third medical scan image 990; and
(ii) the third region representation 978 is updated by transforming the first 960 or second 970 region representation to the frame of reference of the third medical scan image 990, when changes are made to the region of interest ROIa or ROIb displayed on the first 940 or second 950 medical scan images.

The principles explained in connection with FIGS. 8 and 9 may be applied to more than three medical scan images. If there are N medical scan images, then a total of t regions of interest must be stored, where t is less than or equal to N. If t is less than N, at least two of the medical scan images have the region of interest displayed on them on the basis of information from a shared, stored region representation. If the number t is less than N, then this may provide the advantage of saving on storage requirements, in comparison to the situation in FIGS. 7 and 9 where t=N.

Considering the embodiments and alternatives outlined above in connection with FIGS. 6-9, several further detailed implementations are possible. These are outlined below.

The step of capturing second input data from the user may occur whilst displaying both the first medical scan image and the second medical scan image to the user. In the embodiments of FIGS. 8 and 9, the third medical scan image may also be displayed. Each medical scan image therefore provides a view of the region of interest, since the region of interest is visible on each image. If one portion of the region of interest has been created whilst the user makes inputs to the first medical scan image, the user can then add to, or complete, the region of interest by making further inputs on one of the other displayed scan images.

However, as an alternative, the first and second medical scan images can be viewed or displayed alternately, i.e. not simultaneously. In the embodiments of FIGS. 8 and 9, the third medical scan image may also be viewed or displayed alternately with the first and second medical scan images. In this case, the step of capturing second input data from the user will occur whilst displaying to the user only the second or third medical scan image, with the region of interest visible on that image.

A dataset of the first medical scan image may comprise datapoints that describe an anatomical feature, or features, that are also displayed on the second and third medical scan images. The anatomical feature(s) may therefore be the 'content' that is common to the medical scan images. In this case, the first region representation may, for example, comprise a first subset of the points of the dataset that correspond to the first region of interest. Storing such points as the region of interest may require more storage space than just storing information about the geometrical space occupied by the region of interest.

Thus far, the invention has been illustrated with one region of interest on each medical scan image. However, the invention can work with a region of interest displayed on at least the first medical scan image that consists of more than one part of the displayed first medical scan image. In this case, the first stored region representation may provide information about the geometrical space occupied by each of the two or more parts of the regions of interest. These could equally well be termed 'two or more regions of interest', and that phrasing will be used henceforth. Some or all of the at least two regions of interest may, selectably, be displayed on the second medical scan image, and the third or any other medical scan images. The number of regions of interest that are mapped from the first region representation to the second and third region representations depends on what the user wants to achieve. The invention may allow a user to select individual regions of interest that are to be displayed on some medical scan images, if they appear on the first medical scan image. The user may also have the option of choosing a default setting where all regions of interest displayed on the first medical scan image are automatically mapped to the other region representations, and displayed on the other medical scan images.

One example implemented by the inventors comprised five medical scan images. The first medical scan image had sixteen regions of interest displayed on it. Some or all of these sixteen regions of interest could also be displayed on any of the second to fifth medical scan images.

In general terms, with N medical scan images that can be displayed, the invention may be configured to allow display of some or all of the region(s) of interest on some or all of the N medical scan images. However, in its usual configuration, changes to the region(s) of interest made by a user on any of the N medical scan images would be captured. The changed region(s) of interest would then be updated on each of the N medical scan images, to reflect the captured changes, at least when the user chooses to display each image.

If all N medical scan images were displayed simultaneously, the normal configuration of the invention would be to update the region of interest on all N images, when a user made changes to it on any of the N images.

All of the above embodiments and alternatives may display the medical scan images in their original acquisition orientation, such that the user is able to see the original data when defining a region of interest.

Links 762, 772, 862, 872, 882, 962, 972 and 984 all indicate that a transformation is not needed, when the frame of reference of the region representation is the same as the frame of reference of the medical scan image with which it is associated. However, these links may also indicate that the frame of reference of the region representation and the frame of reference its associated medical scan image are related by a simple scaling or translation. The computational requirements for such scaling or translation operations are considerably less than for the transformations indicated by links 664, 765, 865, 965 and 974.

Figure 10:
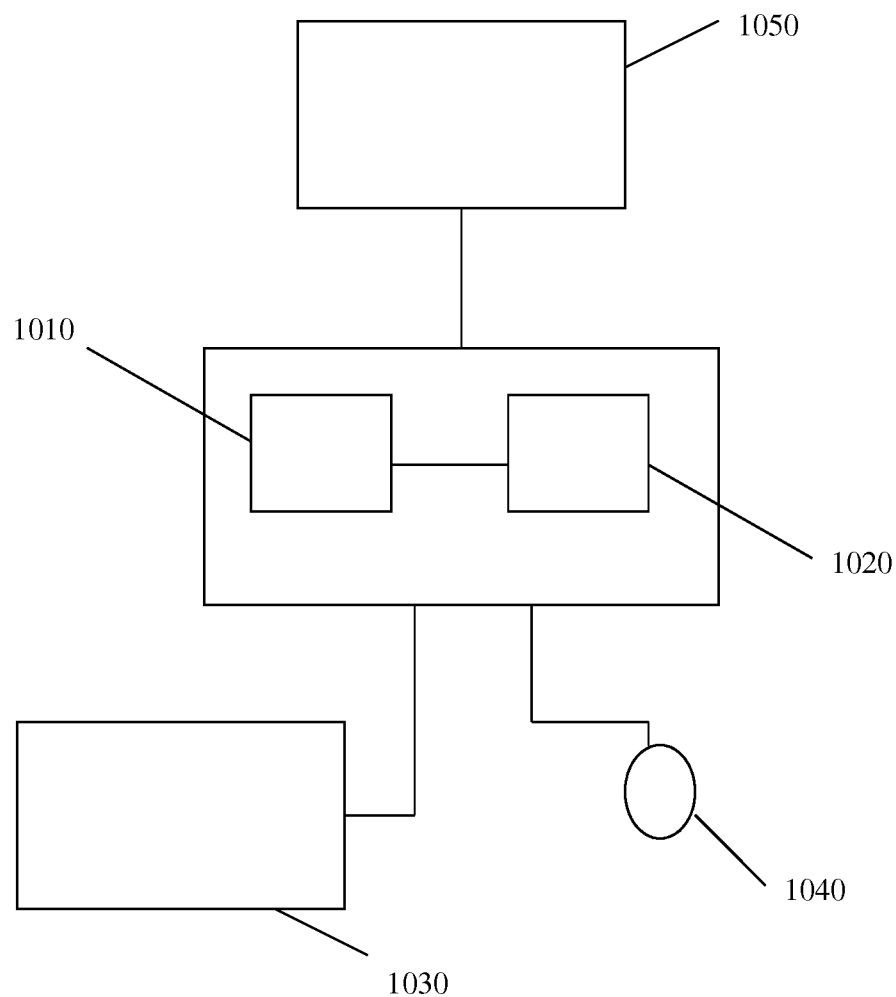
FIG. 10 shows a workstation in accordance with the invention.

FIG. 10 shows a workstation 1000 for implementing a method of defining a region of interest, for display on at least two medical scan images, in accordance with the invention.

Keyboard 1030, mouse 1040 and display screen 1050 facilitate communication with a user of the medical imaging workstation.

First subsystem 1010 of workstation 1000, which may be implemented for example as signal processing logic and memory:
(i) allows a user to define the extent of a region of interest ROI on each of at least two medical scan images;
(ii) allows the selection of medical scan images for display;
(iii) allows the user to decide which medical scan image(s) to display at a given time; and
(iv) may allow the user to decide which regions of interest to display on each medical scan image.

Analysis module 1020 stores the region representations, and transforms the differing region representations using appropriate transformations. For the embodiment of FIG. 6, analysis module 1020 transforms the first region representation 660 directly into the frame of reference of the second medical scan image 650.

Figure 11:
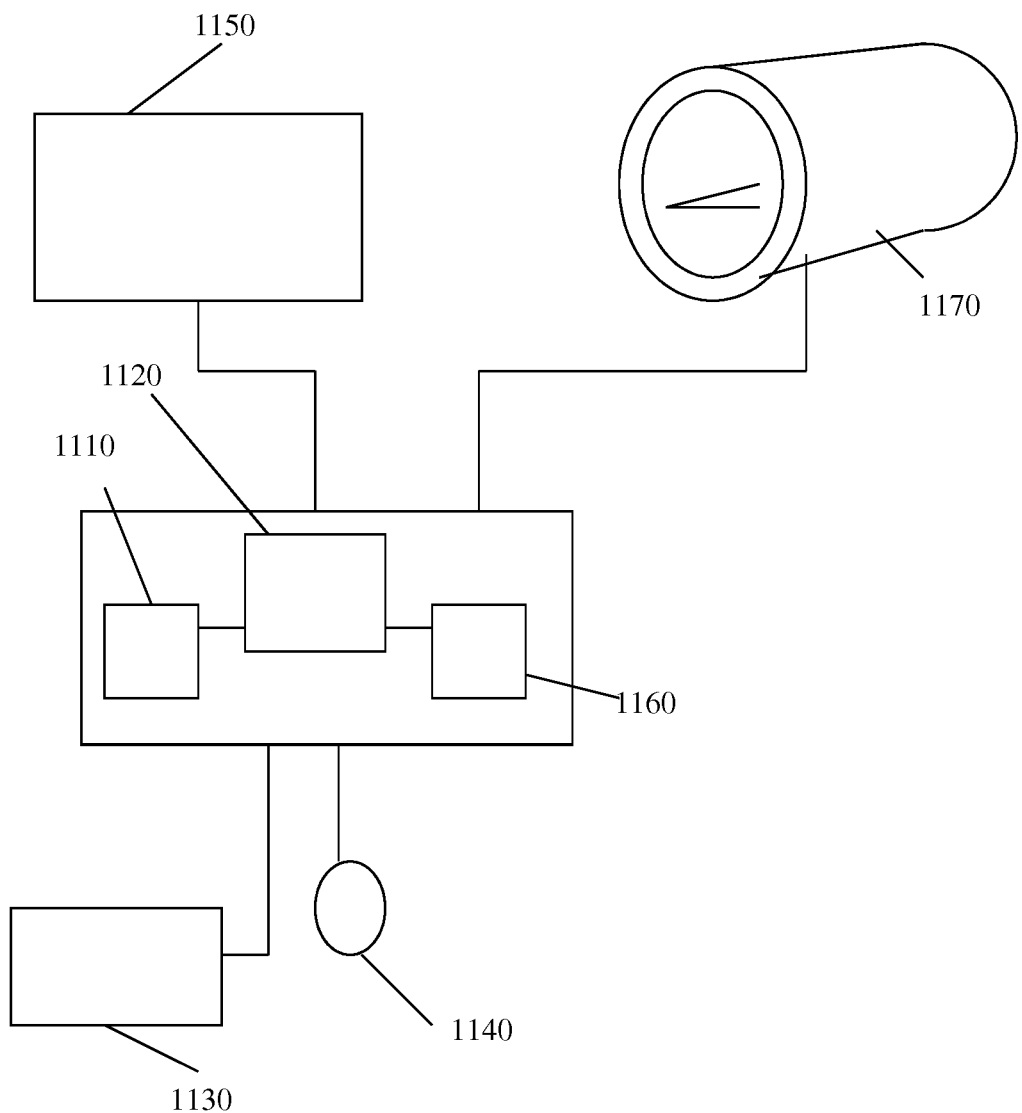
FIG. 11 shows a hybrid scanner in accordance with the invention.

FIG. 11 shows a hybrid scanner 1100 in accordance with the invention. Hybrid scanner 1100 has some analogous components to those described in FIG. 10 for a medical imaging workstation 1000. Keyboard 1130, mouse 1140 and screen 1150 facilitate communication with a user of the hybrid scanner 1100.

Hybrid scanner 1100 comprises:
(i) A control module 1160 that controls a scanning unit 1170, to provide a first scan image and a second scan image. These may be images of tissue, of a subject inside scanning unit 1170. The first and second scan images may be produced using different scanning modes. Multiple images using the same scanning mode can also be provided.
(ii) A first subsystem 1110 that defines the extent of a first region of interest ROI in the first scan image. That region of interest may be region of interest ROIa in any one of scan images 640, 740, 840 or 940. First subsystem 1110 also identifies a second region of interest ROIb in the second scan image, the second region of interest ROIb in the second scan image corresponding to the first region of interest ROIa in the first scan image. The second region may be region of interest ROIb in any one of scan images 650, 750, 850 or 950. First subsystem 1110 may also identify a region of interest in other scan images. This may correspond, for example, to third region of interest ROIc on third images 890 or 990. First subsystem 1110 stores the region representation(s) as described in connection with FIGS. 6-9.
(iii) Analysis module 1120, which may perform the transformations identified in the descriptions of FIGS. 6-9 above.

A computer program product in accordance with the invention has executable code for a method of defining a region of interest for display on at least two medical scan images, each medical scan image comprising corresponding content, the method comprising:
(i) displaying a first medical scan image;
(ii) capturing first input data from a user, the input data defining a region of interest on the first medical scan image;
(iii) storing the captured input data as a first region representation;
(iv) displaying the region of interest on a second medical scan image, based on the first region representation;
(v) capturing second input data from the user, the second input data comprising changes to the region of interest displayed on the second medical scan image;
(vi) updating the first region representation in accordance with the changes, on the basis of the second input data.

The present invention may be used in, for example:
(i) Picture archiving and communication systems (PACS).
(ii) Advanced visualisation workstations.
(iii) Imaging Acquisition Workstations.
(iv) Web based or cloud based medical information and image systems.

Flow Charts of the Invention

FIGS. 12-16 provide flowcharts, which help to illustrate the invention.

Figure 12:
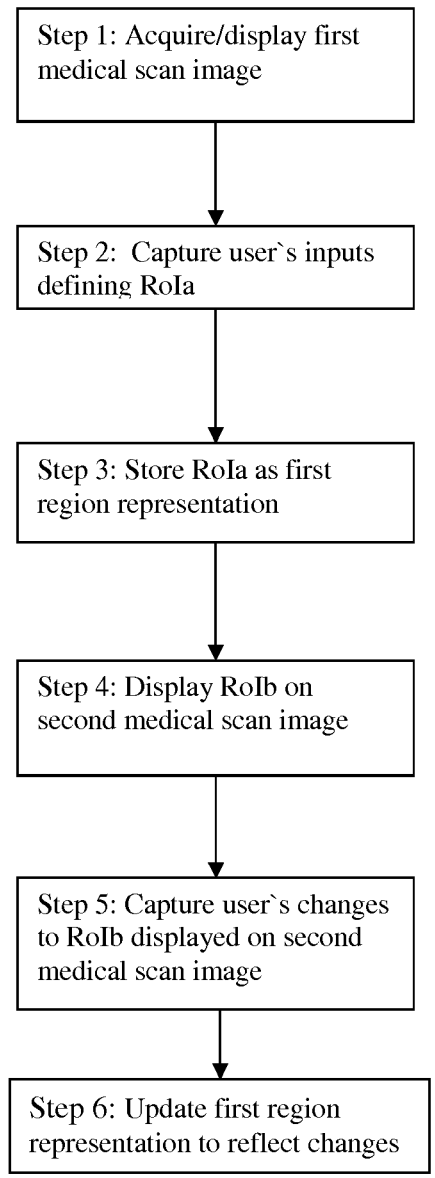
FIGS. 12-16 provide flowcharts, which help to illustrate various versions of the method of the invention.

FIG. 12 shows the steps of the method of the invention. These steps correspond to the steps described in connection with FIGS. 6-9.

Figure 13:
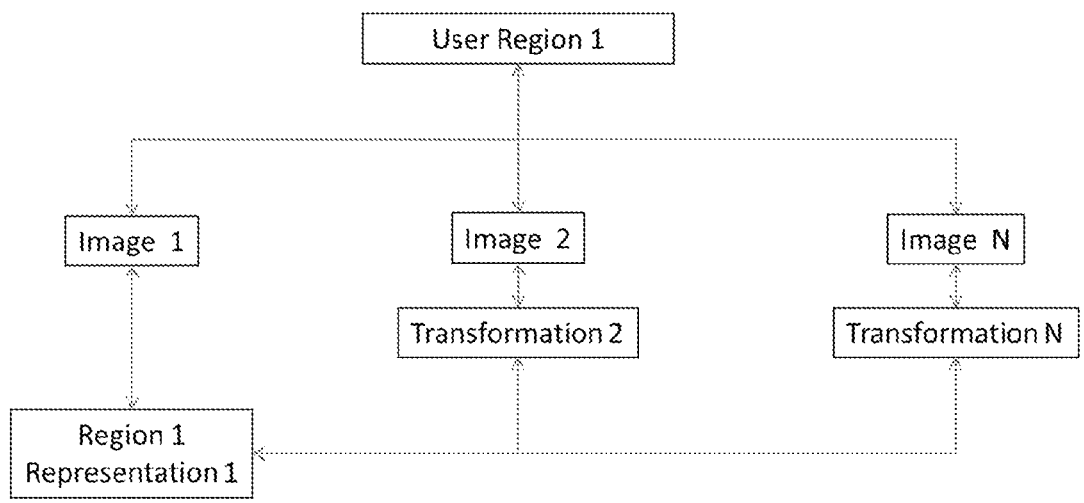

In connection with FIGS. 13-16, the method of the invention has been described in terms of four approaches. The approaches are as follows:

FIG. 13 Showing Approach 1:

The first method, shown in FIG. 13, stores the region delineation as a single object or region representation which defines the region of interest. See also FIG. 6.

This region representation can be displayed on the images via resampling/interpolation to the viewed image, using the transformation between the region representation and the image. The region representation must be defined in some geometrical space. For simplicity this can be the space of one of the existing images, for example the planning CT.

If, for example, the region representation is defined in image 1 on FIG. 13, then, given a transformation from one image 1 to another, say image 2, the region may be displayed in a view showing image 2 in its original orientation. This is done by applying to the region representation a transformation that is suitable for mapping image 1 to image 2. In this manner, the original version of image 2 may be viewed along with the region.

When the user edits the delineation on any image 1, 2 or up to image N shown in FIG. 13, or defines a new region, then:
(i) the edit is transformed via the appropriate transformation back to the frame of reference of the stored representation, and
(ii) the stored representation is then adapted using this transformed edit and
(iii) the viewed delineation is updated on each of, or just on some of, the visible images.

It is possible to display an update either:
(i) only when changes are complete, or
(ii) as soon as the stored region representation has been changed.

As an alternative to defining the representation in the space of one of the images, the region representation could be stored in an independent geometrical space for which there exists a transformation to each of the images that the user wishes to view. See also 'embodiment 2', described in connection with FIG. 6.

Figure 14:
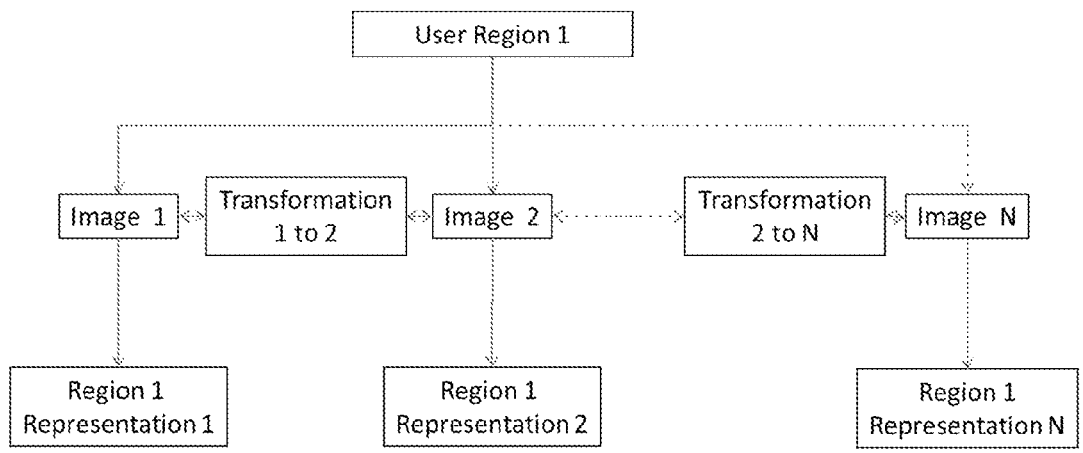

FIG. 14 Showing Approach 2:

The second method defines multiple region representations for one region delineation (region of interest). One region representation is associated with each of the images that the user wishes to consider when defining or editing regions. For visualisation of the region on a particular image, the delineation is simply overlaid on the image. See also FIG. 7.

Importantly, since the transformation between the space in which the region is defined and the space of the image being viewed are identical or trivially related (i.e. a simple scaling or translation), display can be made to be computationally efficient.

Moreover, any user actions can be easily applied to the region representation. Where the user edits the delineation on aby one image, the edit is made to the appropriate internal representation, i.e. to the region representation associated with that image. The updated delineation is subsequently mapped onto the remaining internal representations, using the appropriate transformation, such that all internal representations are synchronised. The visualisation for all images is updated to reflect the new region delineation. The update may occur as and when each image is selected for display to a user.

Figure 15:
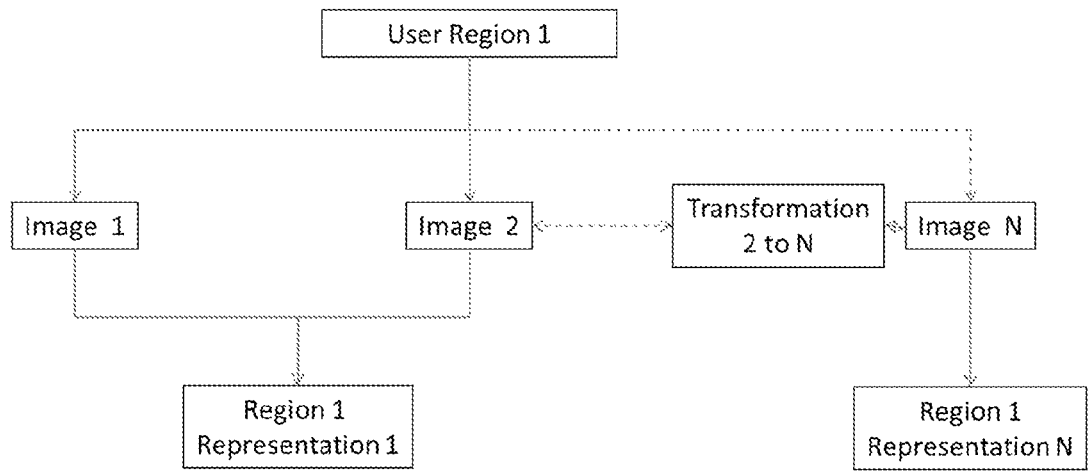

FIG. 15 Showing Approach 3:

In FIG. 15, Image 1 and Image 2 share the same geometrical properties. Approach 3 uses multiple region representations, one for each unique geometry. This is similar to approach 2. However, fewer region representations may be used if a subset of the images share the same geometrical properties, i.e. are identical in size, orientation, resolution etc. This variation reduces the storage requirements of Approach 2.

Figure 16:
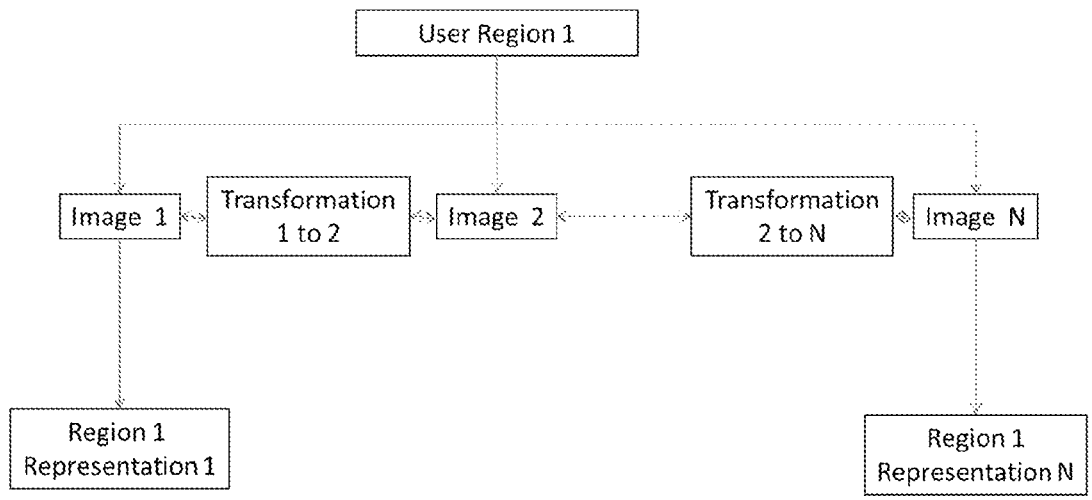

FIG. 16 Showing Approach 4:

Approach 4 uses multiple region representations, but fewer than the number of images. Here fewer representations are used than there are unique image geometries. This variation may be used to reduce the amount of storage space required for the system. However, it necessitates transformations to display contours on those images for which region representations that are trivially related do not exist (similar to Approach 1). In addition, any user action to define new regions or edit existing ones will need to be transformed to a region representation (similar to Approach 1).

In FIG. 16, it is necessary to define which region representation to use when displaying regions on an image for which region representations that are trivially related do not exist. In practice, it can be any of them. However, the best quality results may be obtained when using region representations that have closely related geometric properties. For example, geometric spaces that have the most similar voxel sizes, orientations and so on.

Regarding each of approaches 1-4 above, it is clear that the invention is able to present the medical images to the user in any orientation. This includes the ability to present the user with images in their original acquisition orientation, such that the user is able to see the original data. The various images, regardless of modality, are presented to the user independently. This presentation may be in side-by-side view, or alternately, i.e. the user can switch between image(s) being viewed. Images may also be fused, as in the conventional manner.

To enable the user to delineate regions of interest on multiple images, two approaches can be taken internally within the software, but the perceived effect for the user is that they are editing the same region on multiple images.

Representing Regions in 3-Dimensions with the Invention

Representing regions in 3D can be complex. Several approaches can be taken. For example, the delineation can be represented as a stack of 2D explicit contours, an explicit 3D mesh, a voxel-based mask representation, or a voxel-based implicit representation, see [6]. The invention can be implemented using any of these, or other, region representations. The choice of region representation does not affect the novel advantages of the proposed system, but may affect how complex the system is to implement.

For example, where multiple implicit representations are used internally, mapping of one representation to another can be performed by resampling the implicit function under the appropriate transformation. Whereas, the process of mapping between internal representations becomes more complex if multiple explicit contour 2D stacks are used internally. The edited contour stack must be transformed to the space of the other representation. In this space, the 2D contours may no longer align with the image orientation. Therefore the intersection of each contour with each image plane must be calculated, and a new in-image-plane contour derived from the resultant intersection points. Thus, although the choice of an implicit representation is not essential to this invention, it is preferred as an elegant and convenient way to implement the invention.

For the purpose of radiotherapy planning, such delineations must be saved in an appropriate format, usually DICOM RT Structure Sets. These data files are linked internally to a DICOM image. Whether the delineation is represented internally as a single object, or as a plurality of objects, the export can be made such that the delineation is linked to any of the original DICOM images. In the case of the single representation, the delineation can be mapped to the desired image space using the appropriate transformation. In the case of the multiple region representations, the region can be exported directly from the appropriate region representation or a combination of all of the representations (e.g. a merging).

The invention claimed is:

1. A method of defining a region of interest for display on at least two medical scan images, each medical scan image comprising corresponding content, the method comprising:

displaying a first medical scan image, the first medical scan image comprising a first original data set obtained with first acquisition parameters;

capturing first input data from a user, the input data defining a region of interest on the first medical scan image;

storing the captured input data as a first region representation;

displaying the region of interest on a second medical scan image, based on the first region representation, the second medical scan image comprising a second original data set obtained with second acquisition parameters, the second acquisition parameters being different from the first acquisition parameters;

capturing second input data from the user, the second input data comprising changes to the region of interest displayed on the second medical scan image;

updating the data defining the region of interest stored within the first region representation in accordance with the changes to the region of interest captured on the second medical scan image, thereby creating an updated data set defining the region of interest.

2. A method in accordance with claim 1, wherein:

the first region representation provides information about the geometrical space occupied by the region of interest.

3. A method in accordance with claim 1, further comprising:

capturing further changes to the region of interest on the first and/or second medical scan images;

updating the first region representation in accordance with the further changes; and updating the region of interest on both the first and second medical images, based on the updated region representation.

4. A method in accordance with claim 1, wherein:

the first region representation is stored in the frame of reference of the first medical scan image; and prior to displaying the region of interest on the second medical scan image, the region representation is transformed into the frame of reference of the second medical scan image for display.

5. A method in accordance with claim 1, wherein:
the first region representation is stored in a frame of reference that differs from the frames of reference of the first and second medical scan images;
the step of storing the first input data comprises transforming the first input data from the frame of reference of the first image into the frame of reference of the first region representation;
prior to displaying the region of interest on the second medical scan image, the region representation is transformed from the frame of reference of the first region representation into the frame of reference of the second medical scan image.

6. A method in accordance with claim 1, further comprising:
creating a second region representation, associated with the second medical scan image, the second region representation being initially based on the first region representation; and wherein:
the step of displaying the region of interest on the second medical scan image comprises displaying the second region representation; and
the step of updating the first region representation in accordance with changes to the region of interest displayed on the second medical scan image comprises updating the second region representation, and then updating the first region representation on the basis of the second region representation.

7. A method in accordance with claim 6, wherein:
the first region representation is stored in the frame of reference of the first medical scan image;
the second region representation is stored in the frame of reference of the second medical scan image;
the first region representation is updated by transforming the second region representation to the frame of reference of the first medical scan image, when changes are made to the region of interest displayed on the second medical scan image;
the second region representation is updated by transforming the first region representation to the frame of reference of the second medical scan image, when changes are made to the region of interest displayed on the first medical scan image.

8. A method in accordance with claim 7, further comprising:
displaying the region of interest on at least a third medical scan image, the third medical scan image comprising a third original data set obtained with third acquisition parameters and being a different data set than the first original dataset and the second original dataset;
updating the region of interest on the third medical scan image by transforming the first or the second region representation to the frame of reference of the third medical scan image, when changes are made to the region of interest displayed on the first or second medical scan image, thereby creating a further updated data set defining the region of interest.

9. A method in accordance with claim 7, further comprising:
displaying the region of interest on at least a third medical scan image, the third medical scan image comprising a third original data set obtained with third acquisition parameters and being a different data set than the first original dataset and the second original dataset;
a third region representation, associated with the third medical scan image, the third region representation being stored in the frame of reference of the third medical scan image;
the first and second region representations are updated by transforming the third region representation to the frame of reference of the first and second medical scan images, when changes are made to the region of interest displayed on the third medical scan image; and
the third region representation is updated by transforming the first or second region representation to the frame of reference of the third medical scan image, when changes are made to the region of interest displayed on the first or second medical scan images, thereby creating a further updated data set defining the region of interest.

10. A method in accordance with claim 1, wherein the step of capturing second input data from the user occurs whilst displaying to the user both the first medical scan image and the second medical scan image, with the region of interest visible on both images.

11. A method in accordance with claim 1, wherein the first and second medical scan images are viewed alternately, and the step of capturing second input data from the user occurs whilst displaying to the user only the second medical scan image, with the region of interest visible on the second medical scan image.

12. A method in accordance with claim 1, wherein:
a dataset of the first medical scan image comprises datapoints describing an anatomical feature or features that are also displayed on the second medical scan image; and
the first region representation comprises a first subset of points of the dataset that correspond to the first region of interest.

13. A method in accordance with claim 1, wherein:
the first medical scan image comprises two or more regions of interest;
the first region representation provides information about the geometrical space occupied by each of the two or more regions of interest;
some or all of the at least two regions of interest may, selectably, be displayed on the second medical scan image.

14. A method in accordance with claim 1, further comprising:
displaying the region(s) of interest on at least a third medical scan image, the third medical scan image comprising a third original data set obtained with third acquisition parameters and being a different data set than the first original data set and the second original dataset;
capturing further changes to the region(s) of interest made by a user on any of the first, second or third medical scan images;
updating the region(s) of interest displayed on the first, second or third medical scan images, to reflect the captured changes.

15. A method in accordance with claim 1, further comprising:
displaying the medical scan images in their original acquisition orientation, such that the user is able to see the original data when defining a region of interest.

16. A method in accordance with claim 1, wherein:
the frame of reference of the first region representation and the frame of reference of the first medical scan image are related by a simple scaling or translation.

17. A method in accordance with claim 1, the method comprising:
- displaying the first medical scan image;
- capturing the first input data from a user, the input data defining a the region of interest on the first medical scan image;
- storing the captured input data as the first region representation;
- transforming the region of interest defined by the input data stored as the first region representation into a frame of reference of a second medical scan image;
- displaying the transformed region of interest on the second medical scan image;
- capturing second input data from the user, the second input data comprising changes to the region of interest displayed in the frame of reference of the second medical scan image;
- updating the data defining the region of interest stored within the first region representation in accordance with the changes to the region of interest captured in the frame of reference of the second medical scan image, thereby creating the updated data set defining the region of interest.

18. A medical imaging workstation for defining a region of interest for display on at least two medical scan images, each medical scan image comprising corresponding content, the medical imaging workstation comprising:
- a display screen for displaying a first medical scan image and a second medical scan image, the first medical scan image comprising a first original data set obtained with first acquisition parameters, and the second medical scan image comprising a second original data set obtained with second acquisition parameters, the second acquisition parameters being different from the first acquisition parameters;
- an input means, for capturing first input data from a user, the input data defining a region of interest on the first medical scan image;
- an analysis module, for storing the captured input data as a first region representation; wherein:
- the display screen is operable to display the region of interest on the second medical scan image, based on the first region representation stored in the analysis module;
- the input means are operable to capture second input data from the user, the second input data comprising changes to the region of interest displayed on the second medical scan image;
- an analysis module is operable to update the data defining the region of interest stored within the first region representation in accordance with the changes to the region of interest captured on the second medical scan image, thereby creating an updated data set defining the region of interest.

19. A hybrid medical imaging scanner, comprising:
- a control module, the control module being operable to control a scanning unit to obtain a first medical scan image and a second medical scan image of a portion of tissue, the first and second medical scan images resulting from different scanning modes, the first medical scan image comprising a first original data set obtained with first acquisition parameters, and the second medical scan image comprising a second original data set obtained with second acquisition parameters, the second acquisition parameters being different from the first acquisition parameters;
- a display, for displaying the first and second medical scan images;
- input means, the input means operable to capture input data that defines the extent of a first region of interest in the first scan image;
- a first subsystem, the first subsystem operable to store the captured input data as a first region representation;
- an analysis module, the analysis module operable to transform the first region representation to the frame of reference of the second medical scan image;
- wherein:
- the display is operable to display a second region of interest in the second scan image, based on the transformed first region representation;
- the input means are operable to capture second input data from the user, the second input data comprising changes to the region of interest displayed on the second medical scan image;
- the analysis module is operable to update the data defining the region of interest stored within the first region representation in accordance with the changes to the region of interest captured on the second medical scan image, thereby creating an updated data set defining the region of interest.

20. A non-transitory computer readable medium having executable code including a method of defining a region of interest for display on at least two medical scan images, each medical scan image comprising corresponding content, the method comprising:
- displaying a first medical scan image, the first medical scan image comprising a first original data set obtained with first acquisition parameters;
- capturing first input data from a user, the input data defining a region of interest on the first medical scan image;
- storing the captured input data as a first region representation;
- displaying the region of interest on a second medical scan image, based on the first region representation, the second medical scan image comprising a second original data set obtained with second acquisition parameters, the second acquisition parameters being different from the first acquisition parameters;
- capturing second input data from the user, the second input data comprising changes to the region of interest displayed on the second medical scan image;
- updating the data defining the region of interest stored within the first region representation in accordance with the changes to the region of interest captured on the second medical scan image, thereby creating an updated data set defining the region of interest.

* * * * *